United States Patent [19]
Kuster

[11] Patent Number: 6,082,141
[45] Date of Patent: Jul. 4, 2000

[54] DEVICE FOR STEPWISE BENDING OF GLASS SHEETS

[75] Inventor: Hans-Werner Kuster, Aachen, Germany

[73] Assignee: Saint-Gobain Vitrage, Courbevoie, France

[21] Appl. No.: 09/404,196

[22] Filed: Sep. 23, 1999

Related U.S. Application Data

[62] Division of application No. 08/962,440, Oct. 31, 1997, Pat. No. 5,992,178.

[30] Foreign Application Priority Data

Oct. 31, 1996 [DE] Germany ............... 196 43 935

[51] Int. Cl.[7] .................................................. C03B 23/03
[52] U.S. Cl. .......................... 65/289; 65/260; 65/273; 425/405.1; 198/804; 198/846
[58] Field of Search .................. 65/169, 260, 268, 65/273, 289, 323; 425/405.1; 198/343.1, 700, 773, 804, 846

[56] References Cited

U.S. PATENT DOCUMENTS

| | | | |
|---|---|---|---|
| 3,265,484 | 8/1966 | Ritter et al. ................. | 65/104 |
| 3,778,244 | 12/1973 | Nedelec et al. ............... | 65/106 |
| 4,318,728 | 3/1982 | Claassen ...................... | 65/106 |
| 4,487,623 | 12/1984 | Claassen et al. .............. | 65/106 |
| 4,666,493 | 5/1987 | Frank et al. .................. | 65/29.12 |
| 4,711,653 | 12/1987 | Frank et al. .................. | 65/106 |
| 4,743,285 | 5/1988 | McKelvey ..................... | 65/107 |
| 4,767,437 | 8/1988 | Lampman et al. ............... | 65/104 |
| 4,802,903 | 2/1989 | Kuster et al. ................. | 65/106 |
| 4,816,058 | 3/1989 | Kuster et al. ................. | 65/348 |
| 4,851,026 | 7/1989 | Kuster et al. ................. | 65/273 |
| 4,874,418 | 10/1989 | Kuster et al. ................. | 65/348 |
| 4,902,331 | 2/1990 | Vanaschen et al. ............. | 65/106 |
| 4,904,294 | 2/1990 | Schultz et al. ................ | 65/106 |
| 4,918,946 | 4/1990 | Vanaschen et al. ............. | 65/104 |
| 4,950,320 | 8/1990 | Vanschen et al. .............. | 65/273 |
| 4,976,766 | 12/1990 | Kuster et al. ................. | 65/289 |
| 5,009,695 | 4/1991 | Kuster et al. ................. | 65/182.2 |
| 5,022,906 | 6/1991 | Vanaschen et al. ............. | 65/182.2 |
| 5,022,907 | 6/1991 | Vanaschen et al. ............. | 65/163 |
| 5,330,550 | 7/1994 | Kuster et al. ................. | 65/260 |
| 5,660,609 | 8/1997 | Muller et al. ................. | 65/107 |
| 5,713,976 | 2/1998 | Kuster et al. ................. | 65/106 |
| 5,779,755 | 7/1998 | Kuster et al. ................. | 65/348 |

*Primary Examiner*—Sean Vincent
*Attorney, Agent, or Firm*—Oblon, Spivak, McClelland, Maier & Neustadt, P.C.

[57] ABSTRACT

Glass sheets are bent in stages into the final shape in a horizontal position in two successive bending stations. The glass sheets heated to bending temperature are laid on a fabric carrier arranged resiliently on a rigid support frame. The glass sheets are conveyed stepwise with the fabric carrier and the support frame through the bending system, and are bent together with the fabric carrier which adapts to the shape of the glass sheets.

8 Claims, 3 Drawing Sheets

DEVICE FOR STEPWISE BENDING OF GLASS SHEETS

This application is a divisional of Ser. No. 08/962,440 filed Oct. 31, 1997, now U.S. Pat. No. 5,992,178.

BACKGROUND OF THE INVENTION

1. Field of the Invention

The invention relates to a method for stepwise bending of glass sheets in which the glass sheets heated to bending temperature are bent in stages into the final shape in a horizontal position. More particularly, it relates to a method for stepwise bending of glass sheets in which the glass sheets heated to bending temperature are bent in stages into the final shape in a horizontal position in at least two successive bending stations, are raised by suction in the last bending station by an upper convex bending mold provided with suction openings, and are transferred onto a moveable carrier ring. The invention also relates to devices for carrying out the method.

2. Description of the Related Art

Multistage bending methods employing stepwise pressing bending are advantageous for various reasons. In particular, such multistage bending methods can be used to produce complicated shapes of sheet, for example spherical bends, the production of which in a single-stage bending process is attended by difficulties.

A two-stage bending method and a device suitable for carrying out the method are disclosed, for example, in DE 4203751 C2. In this known bending method, the lower and upper bending molds are constructed as rigid pressing dies in the two bending stations, the upper bending molds in each case being full-area convex suction bending molds. The initially bent glass sheet is transferred by the first suction bending mold into the subsequent pressing bending station, while the suction bending mold of the second pressing bending station transports the finally bent glass sheet into a transfer station in which the glass sheet is transferred onto the support frame. The repeated gripping of the glass sheet during the bending process by the suction bending devices raises the risk that the glass surface is damaged by relative movements between the glass sheet and the suction bending devices.

SUMMARY OF THE INVENTION

It is an object of the invention to provide a stepped bending method having two or more bending stations so as to reduce the relative movements between the support devices which transport the glass sheets stepwise through the bending system.

It is a further object of the invention to provide a stepped bending method which is suitable for bending relatively thin glass sheets It is yet a further object of the invention to provide a stepped bending method which permits the production of spherical bends.

In accordance with the invention, the above and other objects are achieved by conveying the glass sheets, with a fabric carrier and a rigid support frame, stepwise through the bending system, with the glass sheet lying on the fabric carrier arranged resiliently on the support frame, and bending the glass sheet together with the fabric carrier.

A range of important advantages are achieved by the method according to the invention. Firstly, during the entire bending operation the glass sheet at the bending temperature is supported over the entire extent of its area, with the result that the risk of undesired deformations of the glass sheet, for example due to gravity, is reduced to a minimum. Secondly, relative movements are completely avoided between the glass sheet and the carrier conveying the glass sheet through the system and, consequently, the risk of damage to the glass surface is reduced. Furthermore, the accuracy of the positioning of the glass sheet in the individual stations of the bending system is increased, so that the dimensional stability of the finished glass sheet is improved. Finally, because of the abovementioned advantages, the method according to the invention is particularly suitable for spherical bending of very thin glass sheets, for example of glass sheets which are less than 3 mm thick, which tend to form slight corrugated deformations at the edges during bending.

In an advantageous development of the invention, the glass sheet is bent in a first bending step using a lower concave mold whose outer surface, supporting the edge of the sheet, lies essentially in one plane. During the initial bending, the glass sheet is first initially bent and stretched in its middle section, while the edge of the sheet remains in the original plane. When the final bending is performed in the second bending step, the risk of corrugated deformations at the edge is substantially smaller.

In a further development of this method, in the first bending step a further element acts on the edge of the sheet from above and presses the immediate edge region of the glass sheet against the plane edge region of the lower concave mold. In this process, the conditions are selected such that only the outermost edge region of a glass sheet is clamped or held.

The method according to the invention can, for example, be executed in such a way that the bending operation is performed in two steps, the glass sheets also being initially bent in the first bending step by a convex full-area bending mold which can be lowered onto the glass sheet. The upper convex bending mold in this case expediently cooperates with a lower concave bending mold which is arranged below the transport plane of the fabric carrier such that it can be raised and lowered.

In a particularly advantageous way, the bending operation is performed in the first bending station by pneumatic differential pressure, specifically with the aid of a full-area concave bending mold to which a partial vacuum can be applied through bores in the mold surface. The suction bending mold is also arranged below the transport plane of the fabric carrier such that it can be raised and lowered. After the suction bending operation, the fabric carrier with the initially bent glass sheet is released from the mold surface by brief venting, the suction bending mold is lowered, and the support frame with the initially bent glass sheet is transported into the final bending station.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
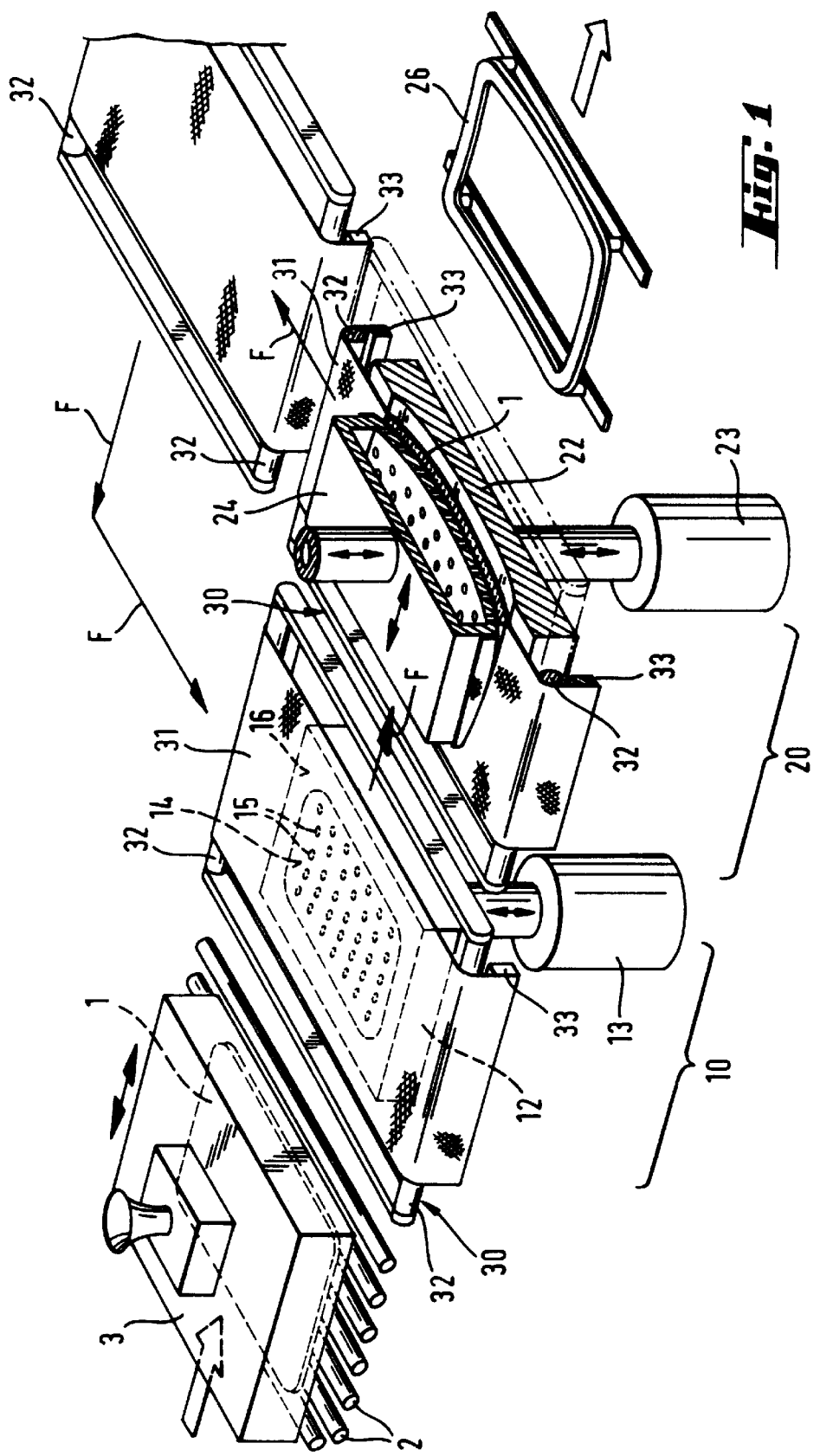
FIG. 1 shows a first embodiment of a bending system according to the invention, in a diagrammatic perspective representation.

Before the glass sheets I are bent in a bending system according to the invention, they are heated to bending temperature in a suitable furnace. The furnace, which is not shown in the figures, can be, for example, a roller-type continuous furnace in which the glass sheets 1 are transported through the furnace on driven transport rollers 2. At the end of the continuous furnace, they are raised from the transport rollers by a suction plate 3 which is planar on the underside. The suction plate 3 can be moved linearly in a suitable way, and brings the glass sheet 1 out of the furnace and into the bending system.

The bending system comprises an initial bending station 10 and a final bending station 20. The bending system shown in FIG. 1 comprises a transport system for the glass sheets, including a plurality of support frames 30 which can be cycled stepwise in a loop along the directions of the arrows F. A fabric section 31 is resiliently clamped on each of the support frames 30 and serves as carrier for the hot glass sheets. Suitable materials for the support frame include commercially available heat-resistant metal fibers. Depending on the desired elasticity and resilience which the carrier material is to exhibit, it is also possible to use fabrics of suitable elements formed from heat-resistant metal fibers.

The fabric carriers 31 extend between two mutually opposite rods 32 on the frame 30, and are laid loosely over the rods 32. Metal rods 33 fastened to the ends of the fabric sections have sufficient weight to tension of the fabric such that it can maintain the shape of the bent glass sheets after the initial bending operation. The first bending station 10 of the bending system comprises a lower suction bending mold 12 which is mounted such that it can be raised and lowered, for example using a pressure cylinder 13. The suction bending mold 12 has a concave mold surface 14 into which there open rows of bores 15 to which a partial vacuum can be applied to initially bend a glass sheet thereon, and to which an over-pressure can instead be applied. The concavity of the concave mold surface 14 corresponds approximately to half of that of the final shape of the sheet. The surface 16 adjoining the concave mold surface 14 of the suction bending mold 12 lies in a plane, with the result that after the initial bending step the edge of the glass sheet likewise lies in a plane, irrespective of the shape of the glass sheet and of the edge profile of the latter after the last bending step.

The lower bending mold 22 in the final bending station 20 is also arranged such that it can be raised and lowered using a pressure cylinder 23. This lower bending mold 22 can be a full-area bending mold or a frame-type bending mold. The lower bending mold 22 cooperates with the upper full-area convex bending mold 24, which is likewise mounted such that it can be raised and lowered by a suitable drive, for example a pressure cylinder. The full-area convex bending mold 24 is provided, in a known way, with bores to which either a partial vacuum or an over-pressure can be applied, and is covered on its mold surface with a fabric made from heat-resistant fibers.

Adjoining the final bending station 20 is a cooling station which is conventional device and is not illustrated. A moveable support ring 26, which corresponds to the shape of the edge of the bent glass sheet, is used to take over the bent glass sheet from the upper bending mold 29 and bring it into the cooling station.

The mode of operation of the device shown in FIG. 1 is as follows: the glass sheet 1 heated to bending temperature is gripped by the moveable suction plate 3 and thereby brought into the bending station 10 and deposited on a fabric section 31 mounted on a frame 30 positioned over the lower bending mold 12 in the initial bending station 10. While the suction plate 3 retracts, the suction bending mold 12 is raised up until it engages the fabric section 31, and a partial vacuum is applied to the suction bending mold 12. Under the effect of the pressure differential due to this suction, the glass sheet and the fabric section 31 are pressed into the concave mold surface 14 with the result that the glass sheet is initially bent. The flexible elastic fabric section is stretched during this operation, the effective length of the fabric being increased in opposition to the weight of the rods 33 fastened on its ends.

After termination of the initial suction operation, the partial vacuum is removed and the mold 12 is released from the fabric section 31 by a short pulse of over-pressure. The suction bending mold 12 is then lowered and the frame 30 moves with the initially bent glass sheet into the final bending station 20 while another frame cycles into the initial bending station to take its place and accept another glass sheet from the movable suction plate 3. After the frame 30 supporting the initially bent glass sheet has been positioned in the final bending section, the lower concave bending mold 22 and the upper convex bending mold 24 are simultaneously moved together, and the glass sheet is thereby pressed into the final shape. The upper bending mold then raises the finally bent glass sheet from the fabric carrier 31 by the effect of suction, which carrier then reassumes its planar form under the tensioning action of the rods 33. The support ring 26 then moves under the upper bending mold 24, takes over the bent glass sheet from the bending mold and brings it into the following cooling station while the following glass sheet is cycled into the final bending station. The frame 30 upon which the glass sheet was mounted is then cycled back toward the initial bending station.

Figure 2:
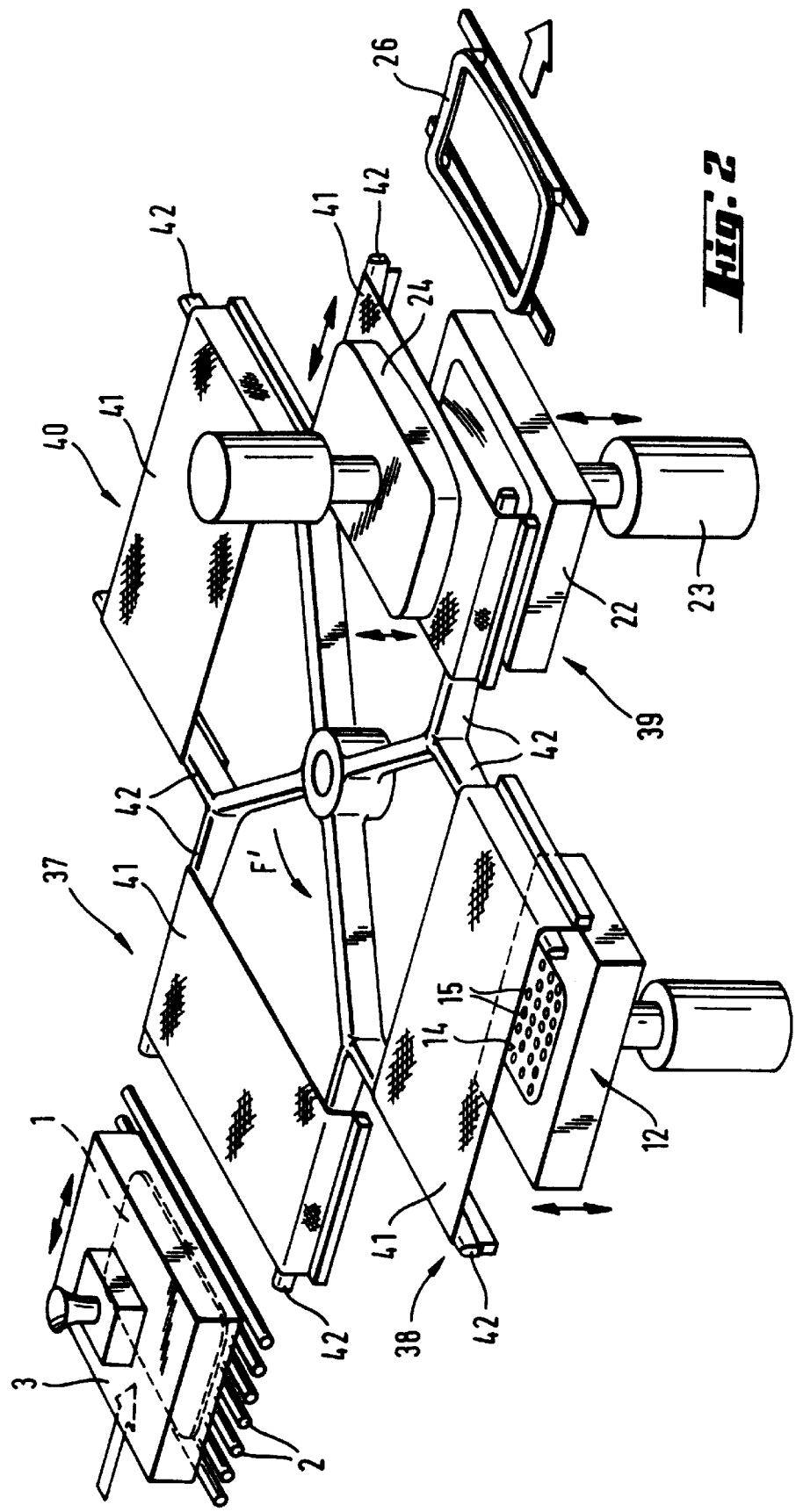
FIG. 2 shows a second embodiment of a bending system according to the invention, likewise in a diagrammatic perspective representation.

The bending system shown in FIG. 2 operates in a similar way. It is constructed in as a carousel with four stations, specifically a depositing station 37, an initial bending station 38, a final bending station 39 and a further station 40 in which, if appropriate, the fabric carrier 41 can be straightened. The fabric carrier sections 41 lie on the arms 42 of a turnstile-like frame which is rotated stepwise by 90° in the direction of the arrow F'. The operations in the depositing station 37, the initial bending station 38 and in the final bending station 39 proceed simultaneously, to produce a higher throughput. The design of the bending molds and the mode of procedure are the same as for the previously described embodiment, and to this extent reference is made to the description of FIG. 1.

Figure 3:
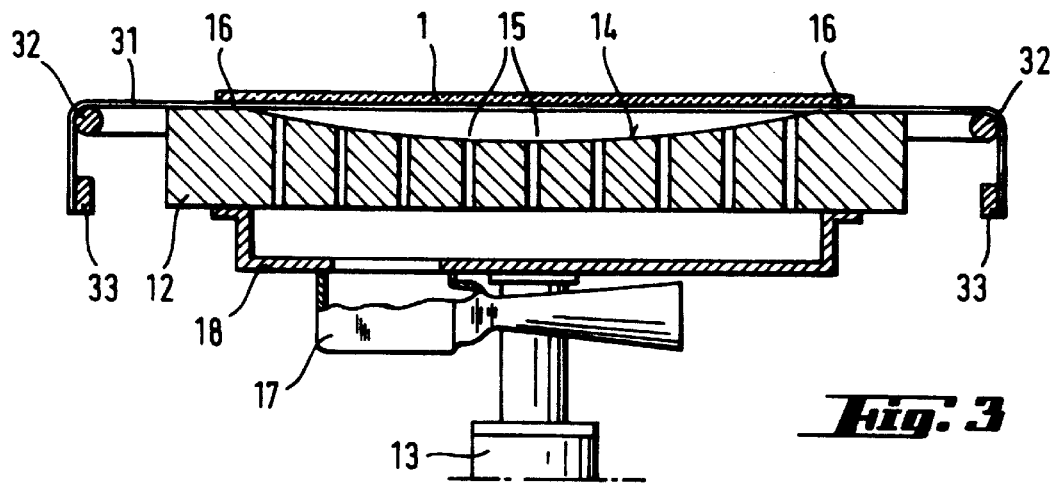
FIG. 3 shows a suction bending device according to the invention, in a sectional representation.

FIG. 3 shows in section the essential details of the initial bending station. The bending mold 12 is shown in its upper end position and is in contact, at its plane surface region 16, with the fabric carrier 31 on which the glass sheet 1 lies in a centered position. Bores 15 in the suction bending mold 12 connect the mold surface 14 to the housing 18 onto which the vacuum pump 17 is mounted. The housing 18 can instead be connected via a flexible vacuum line to a container which is under a partial vacuum, with the result that upon opening of a valve in this line a partial vacuum builds up very quickly in the suction bending mold and presses the glass sheet 1 together with the fabric carrier 31 onto the mold surface 14. Immediately thereafter, the suction bending mold 12 is ventilated and lowered, and the glass sheet 1 is moved with the fabric carrier 31 into the final bending station.

Figure 4:
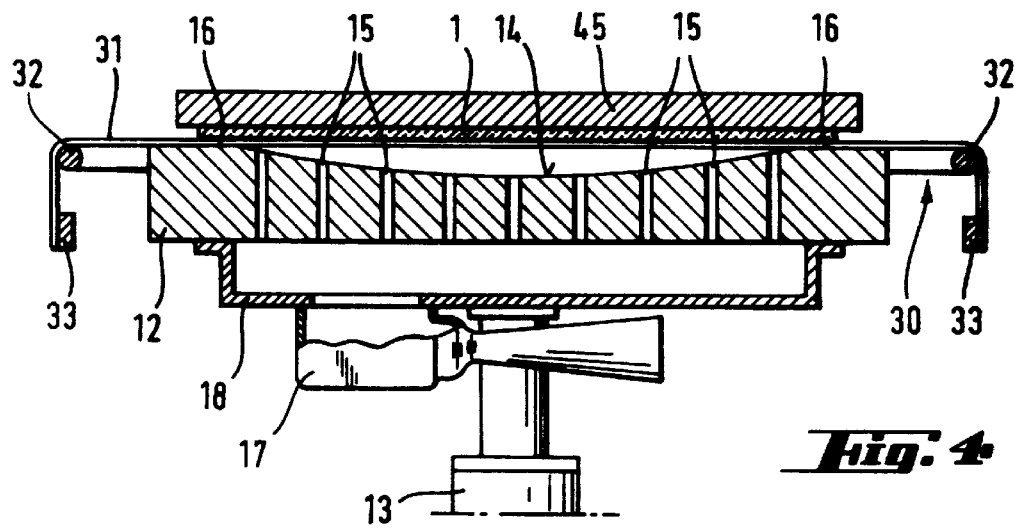
FIG. 4 shows a suction bending device, likewise in section, having an additional holding plate for the edge of the glass sheet.

In the embodiment shown in FIG. 4, the glass sheet 1 is held edgewise from above during the initial bending operation by a planar plate 45 which cooperates with the planar surface region 16 of the suction bending mold 12. The use of such a plate 45 is recommended in cases in which there is a particularly great risk of corrugation at the edge of the glass sheet, for example in the case of particularly strong spherical bends. The suction bending mold is otherwise constructed as in FIG. 3.

Figure 5:
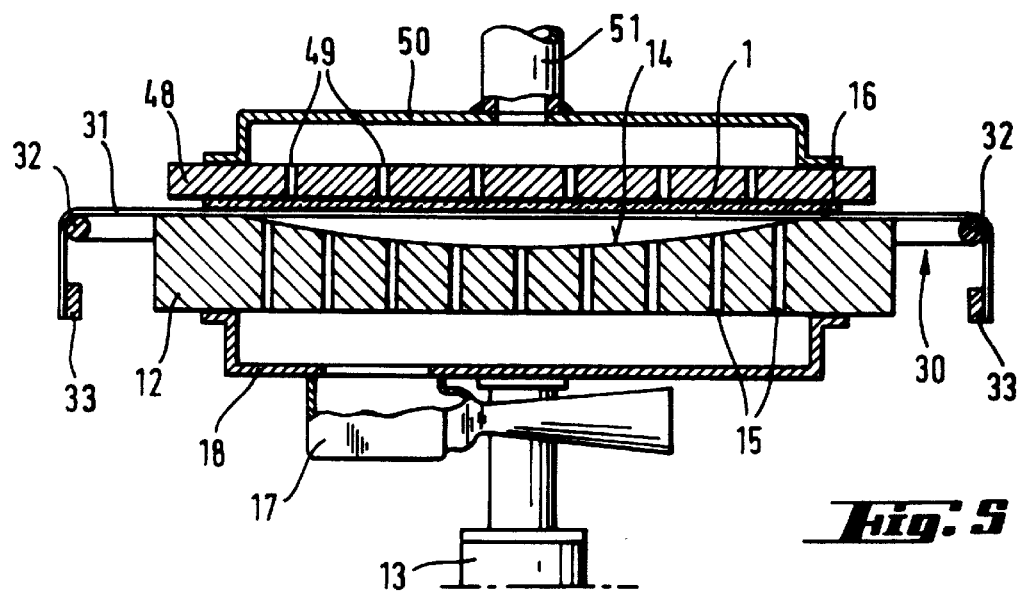
FIG. 5 shows a suction bending device, likewise in section, with additional application of pressure.

In the case of particularly strong spherical bends, the suction force of the suction bending mold 12 may be supplemented by positive pneumatic pressure acting from above onto the glass sheet. A device suitable for this purpose, in which the edge of the glass sheet 1 is simultaneously held to avoid corrugations, is shown in FIG. 5.

In this case, use is again made of a planar pressure plate 48 which cooperates with the planar surface region 16 of the suction bending mold 12 and is lowered onto the glass sheet 1. The surface of the plate 48 is connected via bores 49 to a housing 50 which, via a pressure line 51, is put under an overpressure at the instant at which a partial vacuum is applied to the suction bending mold 12 via the housing 16.

In all the embodiments, the initial bending step is followed by a final bending step with a bending press in the form described above.

Obviously, numerous modifications and variations of the present invention are possible in light of the above teachings. It is therefore to be understood that the invention may be practiced otherwise than as specifically described herein.

What is claimed as new and desired to be secured by Letters Patent of the United States is:

1. An apparatus for stepwise bending of a glass sheet, comprising:

an initial bending station in which a substantially horizontally arranged glass sheet can be initially bent;

a final bending station in which the substantially horizontally arranged glass sheet can be finally bent; and a support device which transfers the initially bent glass sheet from the initial bending station into the final bending station, wherein the support device comprises a rigid support frame and a fabric carrier mounted resiliently on the support frame and supporting the glass sheet.

2. The apparatus of claim 1, wherein the rigid support frame includes opposing rods, and wherein the fabric carrier is laid loosely over the rods and subjected to tension.

3. The apparatus of claim 1 including a concave bending mold in each of said initial and final bending stations, the concave bending mold being upwardly movable to a position engaging a lower surface of the fabric carrier.

4. The apparatus of claim 3, wherein each of said bending molds has a concave surface having at least one bore through which a partial vacuum can be applied.

5. The apparatus of claim 4 including a plate provided in the initial bending station above the bending mold therein, said plate having a planar surface which is engageable with a glass sheet supported by the fabric carrier in the initial bending station to prevent corrugation of edges of the glass sheet during an initial bending operation.

6. The apparatus of claim 5 wherein said plate includes means for applying an overpressure to the planar surface.

7. The apparatus of claim 1 including a plurality of said support devices, each of said support devices including a moveable carriage mounted for stepwise movement in a cycle from the initial bending station to the final bending station and back to the initial bending station.

8. The apparatus of claim 1 including a plurality of said support devices mounted for stepwise rotary movement in a cycle from the initial bending station to the final bending station and back to the initial bending station.

* * * * *